July 23, 1946.  C. ROHULICK  2,404,659
PARACHUTE
Filed Sept. 14, 1944  3 Sheets-Sheet 1

Inventor
CHARLES ROHULICK,

By *Clarence A. O'Brien and Harvey B. Jacobson*
Attorneys

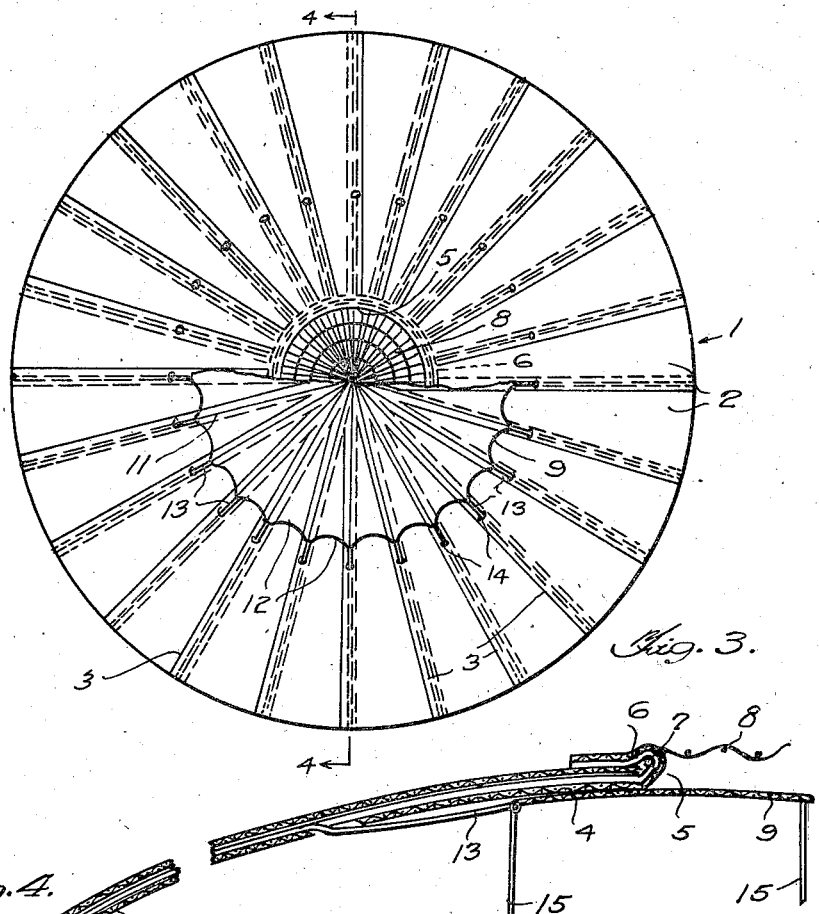
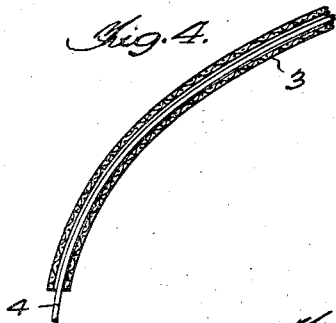
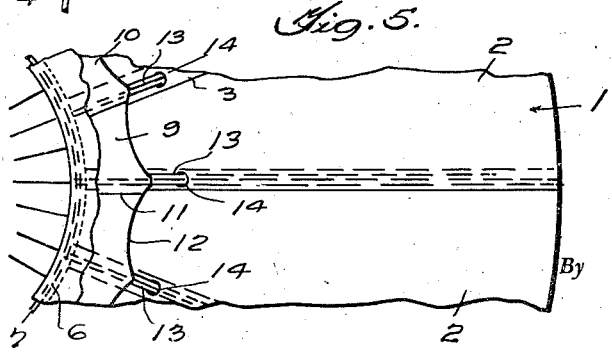
Inventor
CHARLES ROHULICK,

July 23, 1946.  C. ROHULICK  2,404,659
PARACHUTE
Filed Sept. 14, 1944  3 Sheets-Sheet 3

Inventor
CHARLES ROHULICK

By Clarence A. O'Brien
and Harvey B. Jacobson
Attorneys

Patented July 23, 1946

2,404,659

UNITED STATES PATENT OFFICE 2,404,659

PARACHUTE

Charles Rohulick, Scranton, Pa.

Application September 14, 1944, Serial No. 554,067

2 Claims. (Cl. 244—145)

My invention relates to improvements in parachutes, the primary object in view being to equip such devices for quick, easy and safe control, as regards both speed and direction in descending, and also for easy control of the same on the ground.

Other and subordinate objects are also comprehended by my invention, all of which, together with the precise nature of my improvements, will be readily understood when the succeeding description and claims are read with reference to the drawings accompanying and forming part of this specification.

Figure 1:
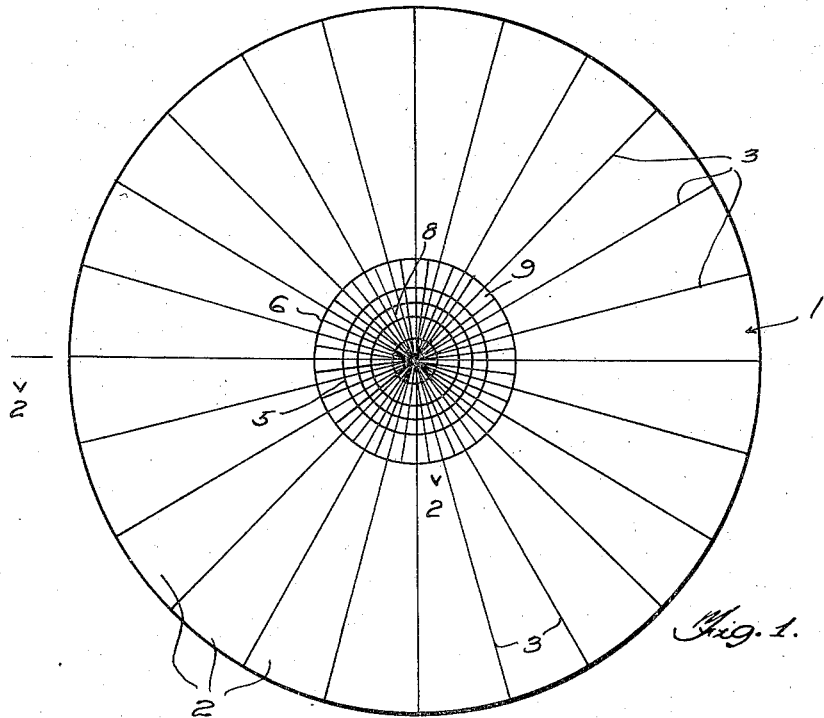
Figure 2:
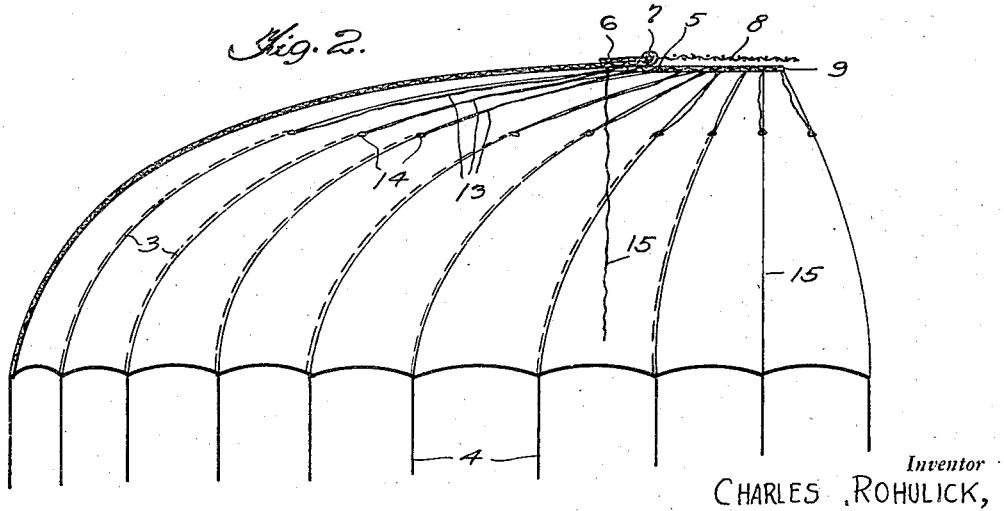

In said drawings:

Figure 1 is a view in top plan of a parachute equipped according to my invention in the preferred embodiment thereof, Figure 2 is a view in transverse section taken on the line 2—2 of Figure 1.

Figure 6:
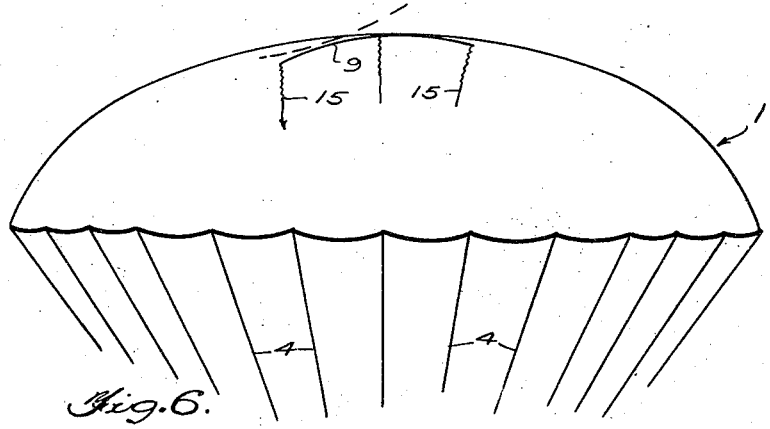
Figure 7:
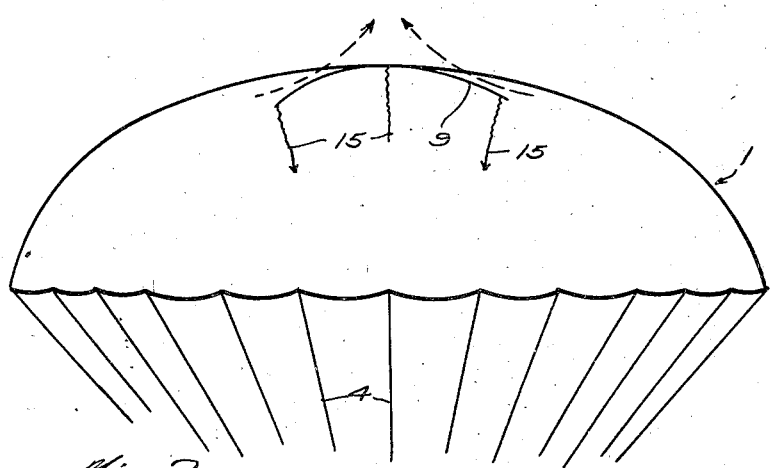
Figure 8:
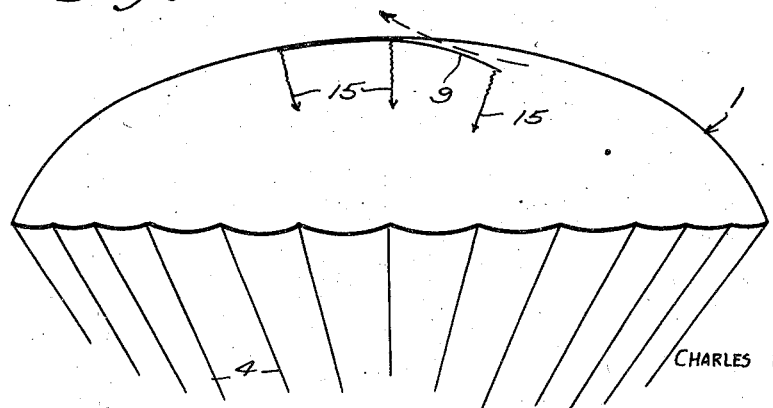

Figure 3 is a view in plan, partly broken away, and looking at the under side of the parachute, Figure 4 is a fragmentary view partly in side elevation and partly in transverse section and drawn to an enlarged scale, Figure 5 is a fragmentary view in plan partly broken away, Figure 6 is a diagrammatic view illustrating the manner in which the auxiliary parachute section may be manipulated to accelerate the descent and cause lateral movement in one direction, Figure 7 is a similar view showing how the auxiliary parachute section may be manipulated to cause quick straight descent, Figure 8 is another similar view showing how the auxiliary parachute section may be manipulated to cause accelerated descent and lateral movement in the opposite direction relative to that in which said parachute will move as illustrated in Figure 6.

Referring to the drawings by numerals, according to my invention, a usual parachute umbrella 1 embodying gored sections 2 having overlapped side edges secured together to provide seams 3 between said sections of double thickness of material, and harness suspension lines 4 interlaid between the double thicknesses of the seams 3 to extend along the same, is provided with an axial comparatively small, circular vent opening 5 bounded by a hem 6 to which said seams 3 extend, and in which is suitably secured a circular anchor cord 7 to which the lines 4 are suitably attached. A circular section 8 of netting extends over the vent opening 5 and is suitably attached at its edge to the hem 6 on the outer or upper side of the umbrella 1.

A relatively small, auxiliary umbrella section 9, substantially circular with the exception presently noted, is provided on the under side of the umbrella 1 and which is of sufficient size to close said vent opening 3 and overlap the edge of the same so as to be compressed against said edge under pressure of air in the umbrella 1 and thereby seal said opening 3 around the edges thereof.

The auxiliary umbrella section 9 is also formed of gore sections 10 of any suitable material having side edges overlapped and suitably secured together to provide radial seams 11 of double thickness of the material, and said auxiliary umbrella section 9 is scalloped around the edge thereof between said seams 11, as at 12, to facilitate ballooning action of said section. The seams 11 correspond in number to the seams 3 so as to align with the latter for a purpose presently seen.

Attaching lines 13 for the auxiliary umbrella section 9 are provided which are suitably fixed in the seams 11 to extend along the same and extend out of the outer ends of said seams. The attaching lines 13 are extended through openings 14 in the under sides of the seams 3 into said seams and from said openings along said seams 3 to substantially the outer edge of the umbrella 1. From the openings 14, the outer end portions of the attaching lines 13 are suitably secured in said seams 3. From the openings 14 to the auxiliary umbrella section 9, said attaching lines 13 are exposed and somewhat slack, and the openings 14 are spaced sufficiently remote from said section 9 to expose the attaching lines so that the edge of the auxiliary umbrella section 9, as presently described, may be pulled away from the edge of the vent opening 5 or permitted to close said opening.

Manipulative pull lines 15 are suitably attached at one end to the outer ends of the seams 11 to depend therefrom for grasping by the person descending in the parachute.

The manner in which the described invention is to be used and operates will be readily understood. When the parachute is descending and the manipulative pull lines 15 are relieved of pull thereon, the auxiliary umbrella section 9 is pressed against the netting 8 and the edge of the vent opening 5, by the compression in the umbrella 1 and against said section, and said opening is closed. By pulling the edge of the auxiliary umbrella section 9 at one side thereof away from the edge of the vent opening 5, as illustrated in Figure 6, the parachute may be caused to quicken its descent and to move laterally in one direction. By manipulating the pull cords 15 to pull the edge of the auxiliary umbrella section away from the edge of said vent opening 5 all around said edge, as shown in Figure 7, the parachute may be caused to quickly descend with a suddenly accelerated action. By pulling the edge of the auxiliary umbrella section 9 opposite to that shown in Figure 6, as similarly manipulated, away from the edge of the vent opening 5, the parachute may be caused to descend with an accelerated action and to move in the direction opposite to that in which it will be moved according to the showing in Figure 5.

As will be seen, the vent opening 5 and the edge thereof, together with the auxiliary umbrella section 9, form, in operation, a valve in the axis of the umbrella 1 and which may be opened variably by pull exerted on the pull cords 15 to accelerate descent of the parachute and/or direct the same laterally as required. By completely opening, or uncovering, the vent opening 5 when the person descending has reached the ground, collapse of the umbrella 1 may be facilitated and handling and control of the parachute in collapsing the same rendered easy and safe.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a parachute, an umbrella having a circular axial opening therein forming an air release vent, and radial seams extending from said opening to the perimeter of the umbrella, means operative to close said opening under pressure of air in said umbrella comprising an auxiliary umbrella section larger than said opening to overlap the edge of the same, means to attach said section in said umbrella comprising cords attached to the edge of said section and extended into said seams intermediate the ends of the same with end portions extending along the seams and fixed therein, and pull lines attached to said section at different points whereby different portions of said section may be pulled away from the opening to variably open the same.

2. In a parachute, an umbrella having a circular axial opening therein forming an air release vent, and radial seams extending from said opening to the perimeter of the umbrella, means operative to close said opening under pressure of air in said umbrella comprising an auxiliary umbrella section larger than said opening to overlap the edge of the same, means to attach said section in said umbrella comprising cords attached to the edge of said section and extended into said seams intermediate the ends of the same with outer end portions extending along the seams and fixed therein, pull lines attached to said section at different points whereby different portions of said section may be pulled away from the opening to variably open the same, the inner end portions of the cords being attached to the edge of said section and free between said section and the points of extension into said seams to thereby provide for floating movement of said section.

CHARLES ROHULICK.